(12) United States Patent
Kanungo et al.

(10) Patent No.: US 9,056,958 B2
(45) Date of Patent: *Jun. 16, 2015

(54) FUSER MEMBER

(75) Inventors: Mandakini Kanungo, Webster, NY (US); Maryna Ornatska, Webster, NY (US); David Gervasi, Pittsford, NY (US); Santokh Badesha, Pittsford, NY (US); Matthew M. Kelly, W. Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 271 days.

This patent is subject to a terminal disclaimer.

(21) Appl. No.: 13/517,740

(22) Filed: Jun. 14, 2012

(65) Prior Publication Data

US 2013/0338293 A1    Dec. 19, 2013

(51) Int. Cl.
| | | |
|---|---|---|
| *C08J 3/24* | (2006.01) | |
| *C08J 7/04* | (2006.01) | |
| *C09D 127/12* | (2006.01) | |
| *C08L 71/00* | (2006.01) | |
| *G03G 15/20* | (2006.01) | |

(52) U.S. Cl.
CPC .... *C08J 3/24* (2013.01); *C08J 7/04* (2013.01); *C09D 127/12* (2013.01); *C08L 71/00* (2013.01); *G03G 15/2053* (2013.01)

(58) Field of Classification Search
USPC ............ 524/431; 525/102, 104, 326.3, 326.4
See application file for complete search history.

(56) References Cited

U.S. PATENT DOCUMENTS

| | | | | |
|---|---|---|---|---|
| 5,141,991 | A * | 8/1992 | Konno et al. ................. | 525/102 |
| 5,166,031 | A * | 11/1992 | Badesha et al. .......... | 430/124.33 |
| 5,321,083 | A * | 6/1994 | Hanada et al. ................ | 525/102 |
| 5,366,772 | A * | 11/1994 | Badesha et al. .............. | 428/35.8 |
| 5,384,374 | A * | 1/1995 | Guerra et al. ............... | 525/326.4 |
| 5,637,643 | A * | 6/1997 | Umeda et al. ................ | 524/537 |
| 5,700,861 | A * | 12/1997 | Tomihashi et al. ........... | 524/344 |
| 5,736,250 | A * | 4/1998 | Heeks et al. .................. | 428/447 |
| 6,606,476 | B2 * | 8/2003 | Law et al. .................... | 399/307 |
| 6,680,095 | B2 * | 1/2004 | Gervasi et al. ............... | 428/36.8 |
| 6,808,814 | B2 * | 10/2004 | Kaplan et al. ................ | 428/447 |
| 7,294,377 | B2 * | 11/2007 | Gervasi et al. ............... | 428/36.8 |
| 7,494,706 | B2 * | 2/2009 | Chen et al. ................... | 428/339 |
| 8,007,912 | B2 | 8/2011 | Kuntz et al. | |
| 8,010,032 | B2 | 8/2011 | Blair et al. | |
| 2010/0105819 | A1* | 4/2010 | Nakazato et al. ............ | 524/267 |
| 2010/0209155 | A1* | 8/2010 | Kimura ........................ | 399/333 |
| 2010/0221444 | A1* | 9/2010 | Kaplan et al. ................ | 427/425 |
| 2012/0009438 | A1* | 1/2012 | Dams et al. .................. | 428/704 |
| 2012/0076931 | A1 | 3/2012 | Wu | |

* cited by examiner

*Primary Examiner* — Nicole M Buie-Hatcher
(74) *Attorney, Agent, or Firm* — Fay Sharpe LLP

(57) ABSTRACT

A fuser member includes a surface layer comprising a fluoroelastomer-perfluoropolyether composite formed from a reaction mixture comprising a fluoroelastomer and a perfluoropolyether compound. Methods of manufacturing the fuser member and printing systems comprising the fuser member are also disclosed.

14 Claims, 2 Drawing Sheets

FUSER MEMBER

BACKGROUND

The present disclosure is related to fuser members having a surface layer as described herein. The fuser members are suitable for use in various marking apparatuses and methods.

The use of thermal energy for fixing toner images onto a support member is known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It may be undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combinations of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface, which has a low surface energy to provide the necessary release. To ensure and maintain good release properties of the fuser roll, it has become customary to apply release agents to the fuser roll during the fusing operation. Typically, these materials are applied as thin films of, for example, nonfunctional silicone oils or mercapto- or amino-functional silicone oils, to prevent toner offset.

It would be desirable to identify alternate materials that are suitable for use in fuser members.

BRIEF DESCRIPTION

The present disclosure relates to fuser members. The fuser members include a surface layer made of a fluoroelastomer-perfluoropolyether composite.

Disclosed in various embodiments is a fuser member comprising a surface layer, wherein the surface layer includes a fluoroelastomer-perfluoropolyether composite formed from a reaction mixture comprising a fluoroelastomer and a perfluoropolyether compound.

The weight ratio of fluoroelastomer to perfluoropolyether compound may be from about 50:40 to about 85:5.

The perfluoropolyether compound may include terminal amino groups. In some specific embodiments, the perfluoropolyether compound includes terminal oxysilane groups, and the reaction mixture further comprises an oxyaminosilane. The oxyaminosilane can be an amino-terminated siloxane. The amino-terminated siloxane can be an aminopropyl terminated polydimethylsiloxane. In some variations, the amino-terminated siloxane has a molecular weight of from about 500 to about 1500. The mole ratio of the oxyaminosilane to the perfluoropolyether compound can be from about 2:1 to about 1:10.

The surface layer may further comprise a filler. The filler can be present in an amount of from 5 to about 20 weight percent of the surface layer. The filler may be selected from the group consisting of carbon black, iron oxide, carbon nanotubes, graphite, graphene, and carbon fibers. The filler can have an average particle size of from about 2 nanometers to about 10 microns.

Also disclosed is a method of manufacturing a fuser member surface layer, comprising: depositing a surface layer composition upon a mold; and curing the surface layer at an elevated temperature; wherein the surface layer composition comprises a composite formed from the reaction of a fluoroelastomer and a perfluoropolyether compound.

The curing may be conducted at a temperature of from about 400° F. to about 500° F.

The weight ratio of fluoroelastomer to perfluoropolyether compound can be from about 50:40 to about 85:5.

Sometimes, the reaction mixture further comprises an oxyaminosilane. The mole ratio of the oxyaminosilane to the perfluoroether compound may be from about 2:1 to about 1:10.

Also disclosed in embodiments is a printing system, comprising: a fuser member comprising a surface layer; the surface layer includes a fluoroelastomer-perfluoropolyether composite formed from a reaction mixture comprising a fluoroelastomer and a perfluoropolyether compound.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
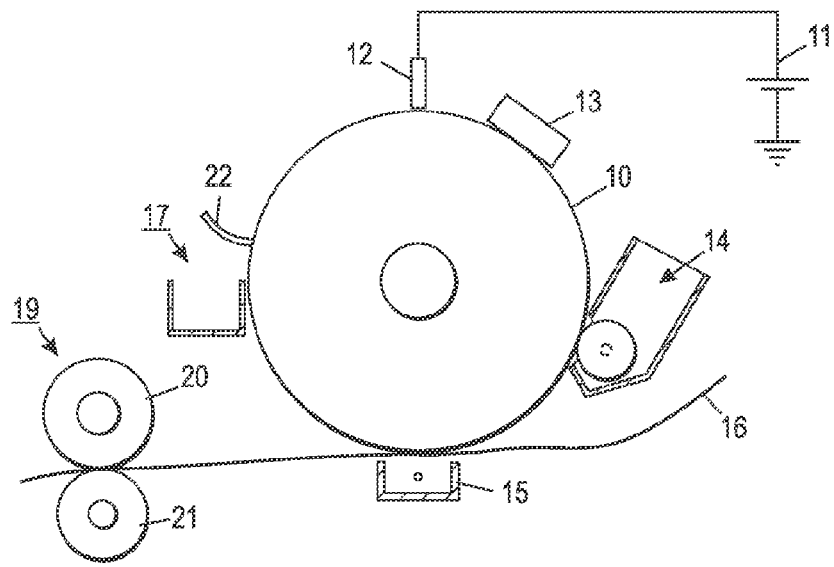
FIG. 1 is an illustration of a general electrostatographic apparatus.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

As used herein, the term "fuser" or "fixing" member, and variants thereof, may be a roll, belt such as an endless belt, flat surface such as a sheet or plate, or other suitable shape used in the fixing of thermoplastic toner images to a suitable substrate. IT may take the form of a fuser member, a pressure member, or a release agent donor member preferably in the form of a cylindrical roll.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 105 is cleaned therefrom by use of a blade 22 (as shown in FIG. 1), brush, or other cleaning apparatus. Although the fusing station 19 depicts the fusing and pressure members as rollers, the fuser and/or pressure member(s) may also be in the form of belts, sheets, films or other like fusing members.

Figure 2:
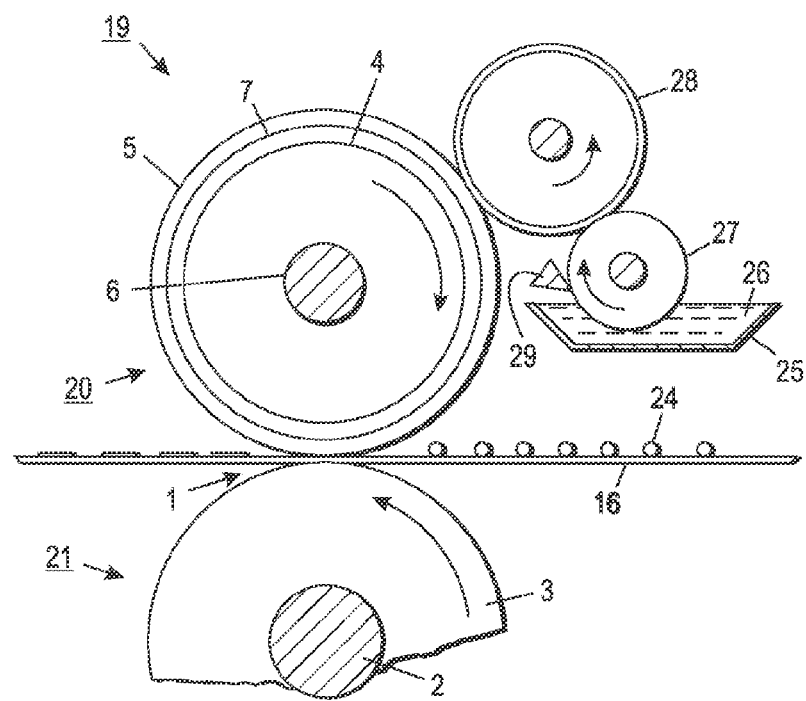
FIG. 2 is a sectional view of a fusing belt in accordance with an embodiment of the present disclosure.

Referring to FIG. 2, an embodiment of a fusing station 19 is depicted with an embodiment of a fuser roll 20 comprising polymer surface 5 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. The fuser member 20 can include an adhesive, cushion, or other suitable layer 7 positioned between core 4 and surface layer 5. Backup or pressure roll 21 cooperates with fuser roll 20 to form a nip or contact arc 1 through which a copy paper or other substrate 16 passes such that toner images 24 thereon contact elastomer surface 5 of fuser roll 20. As shown in FIG. 2, an embodiment of a backup roll or pressure roll 21 is depicted as having a rigid steel core 2 with a polymer or elastomer surface or layer 3 thereon. Sump 25 contains polymeric release agent 26 that may be a solid or liquid at room temperature, but it is a fluid at operating temperatures. The pressure member 21 may include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicrometer thickness to thicknesses of several micrometers of release fluid. Thus, in embodiments, by metering device 29, from about 0.1 to about 2 micrometers or greater thicknesses of release fluid can be applied to the surface of polymer or elastomer 5.

Figure 3:
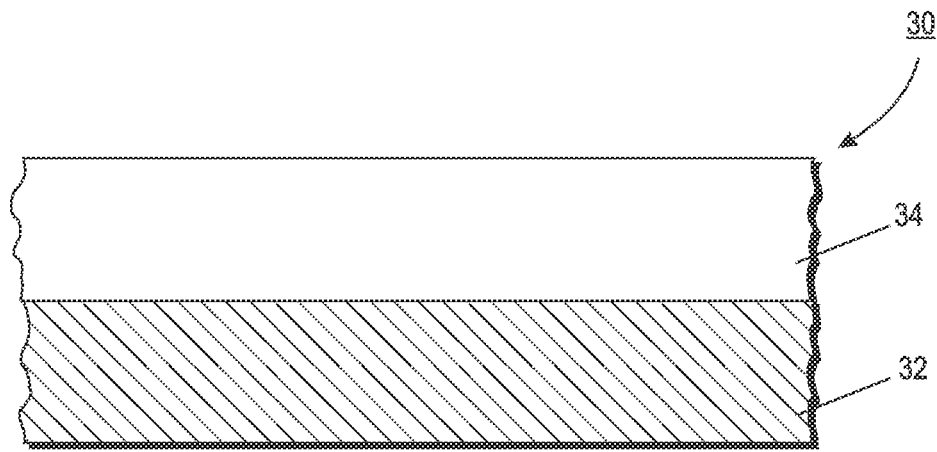
FIG. 3 is a schematic sectional view of a fuser component having a two layer configuration, wherein the surface layer comprises a coating in accordance with the present disclosure.

With reference to FIG. 3, an embodiment of a fusing component is shown. FIG. 3 depicts a fusing component 30 having a two layer configuration and comprising a substrate 32 and a surface layer 34 positioned over the substrate. Surface layer 34 comprises a fluoroelastomer-perfluoropolyether composite.

Figure 4:
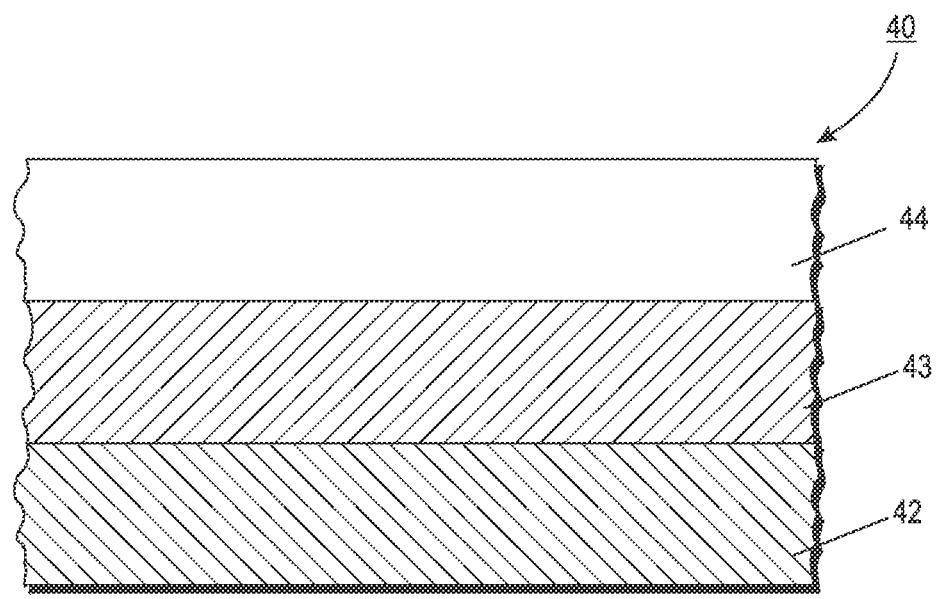
FIG. 4 is a schematic cross sectional view of a fuser component having a three layer configuration, wherein the surface layer comprises a coating in accordance with the present disclosure.

With reference to FIG. 4, a fuser component 40 having a three layer configuration is shown. Fuser component 40 includes substrate 42 surface layer 44, and intermediate layer 43 disposed between substrate layer 42 and surface layer 44. Surface layer 44 comprises a coating composition in accordance with the present disclosure, which comprises a fluoroelastomer-perfluoropolyether composite.

While the fuser components depicted in FIGS. 3 and 4 are shown as fuser belts, the fuser component in accordance with the present disclosure can be of any suitable configuration. For example, a fuser component may be in the form of sheet, a film, a web, a foil, a strip, a coil, a cylinder, a drum, a roller, an endless strip, a circular disc, a belt including an endless belt, an endless seamed flexible belt, an endless seamless flexible belt, an endless belt having a puzzle cut seam, and the like.

It will be further appreciated by those skilled in the art that a fuser component in accordance with the present disclosure is not limited to two layer and/or three layer configurations. A fuser component in accordance with the present disclosure may include any number of intermediate layers and/or adhesive layers, as desired, disposed between a substrate and a surface layer.

Generally, the fluoroelastomer-perfluoropolyether composite is formed by the reaction of a fluoroelastomer and a perfluoropolyether compound (PFPE). The fluoroelastomer-perfluoropolyether composite can be formed in at least two ways. In a first method, the fluoroelastomer-perfluoropolyether composite is formed from the reaction of a fluoroelastomer and a perfluoropolyether compound that has terminal amino groups. In a second method, the fluoroelastomer-perfluoropolyether composite is formed from the reaction of a fluoroelastomer, an oxyaminosilane, and a perfluoropolyether compound that has terminal oxysilyl groups.

The fluoroelastomer may be a copolymer that contains monomers exclusively selected from the group consisting of hexafluoropropylene (HFP), tetrafluoroethylene (TFE), vinylidene fluoride (VDF), perfluoromethyl vinyl ether (PMVE), and ethylene (ET). The term copolymer here refers to polymers made from two or more monomers. Fluoroelastomers usually contain two or three of these monomers, and have a fluorine content of from about 60 wt % to about 70 wt %. Put another way, a fluoroelastomer may have the structure of Formula (1):

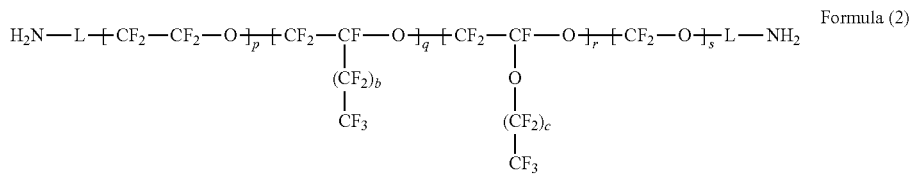

Formula (1)

where f is the mole percentage of HFP, g is the mole percentage of TFE, h is the mole percentage of VDF, j is the mole percentage of PMVE, and k is the mole percentage of ET; f+g+h+j+k is 100 mole percent; f, g, h, j, and k can individually be zero, but f+g+h+j must be at least 50 mole percent. Please note that Formula (1) only shows the structure of each monomer and their relative amounts, and should not be construed as describing the bonds within the fluoroelastomer (i.e. not as having five blocks). Fluoroelastomers generally have superior chemical resistance and good physical properties. Exemplary fluoroelastomers are available as Tecnoflon P959 from Solvay or Dal-el G-621 from Daikin (a VDF-TFE-HFP terpolymer). Tecnoflon P959 contains 100 wt % of a VDF-TFE-HFP terpolymer.

The fluoroelastomer alone may exhibit poor ink release. Inclusion of a perfluoropolyether compound provides the fuser member with a balance of non-swelling and ink release properties. The term "perfluoropolyether compound" refers to a compound containing at least one perfluoro group and at least two ether linkages. In embodiments, the perfluoropolyether compound may have terminal amino groups or terminal oxysilyl groups. The abbreviation "PFPE" may be used herein to refer to the perfluoropolyether compound.

The term "perfluoro group" refers to a radical that is composed entirely of carbon atoms and fluorine atoms. The radical may be linear, branched, or cyclic. The radical may be univalent or divalent. Exemplary perfluoro groups include, among others, perfluoromethylene ($-CF_2-$), perfluoroethylene ($-CF_2CF_2-$), and perfluoromethyl ($-CF_3$).

The term "ether linkage" refers to an oxygen atom being covalently bonded to two different atoms, i.e. R—O—R.

One example of a perfluoropolyether compound having terminal amino groups is shown below in Formula (2):

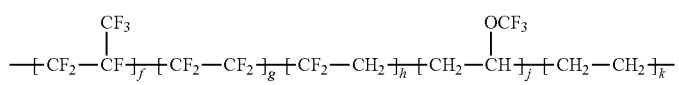

Formula (2)

where b and c are independently from 0 to 10; p, q, r, and s are independently the mole percentage of their respective monomer; and each L is a linking group. Exemplary linking groups include alkyl, amide, carbonyl, and combinations thereof. The perfluoropolyether compound may have an average molecular weight of from about 1000 to about 3000. Please note that Formula (2) only shows the structure of each monomer and their relative amounts, and should not be construed as describing the bonds within the perfluoropolyether (i.e. not as having four blocks).

The term "alkyl" as used herein refers to a radical which is composed entirely of carbon atoms and hydrogen atoms which is fully saturated. The alkyl radical may be linear, branched, or cyclic. Linear alkyl radicals generally have the formula $-C_nH_{2n+1}$. The alkyl radical may be univalent or divalent.

The term "amide" refers to a radical of the formula $-NH-CO-$.

The term "carbonyl refers to a radical of the formula $-CO-$.

In the first method referenced above, a perfluoropolyether compound that has terminal amino groups can be used to crosslink the fluoroelastomer and form a fluoroelastomer-perfluoropolyether composite. Only two ingredients are needed here. The reaction mechanism (1) is shown here in two steps. In Step (1), a fluoroelastomer polymer chain is dehydrofluorinated by the amino group (the perfluoropolyether segments are labeled here as PFPE to save on space):

Reaction (1) Step (1)

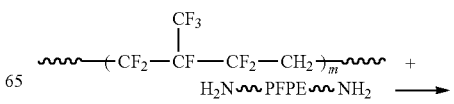

-continued

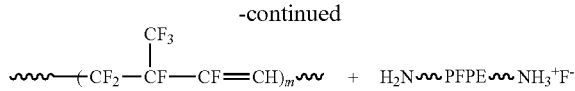

In Step (2), the perfluoropolyether compound acts to crosslink two fluoroelastomer polymer chains:

Reaction (1) Step (2)

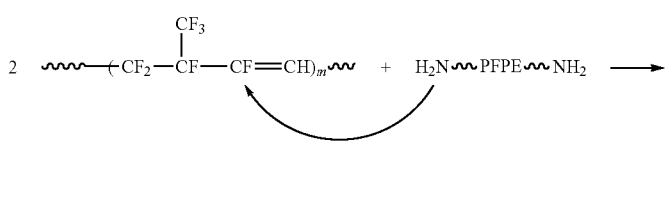

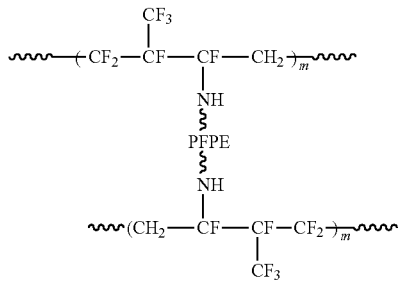

Alternatively, the perfluoropolyether compound may have terminal oxysilyl groups. An oxysilyl group has a silicon atom which is covalently single bonded to at least one oxygen atom, with each oxygen atom also being covalently bonded to another atom. An exemplary perfluoropolyether compound having terminal oxysilyl groups is shown below in Formula (3):

Formula (3)

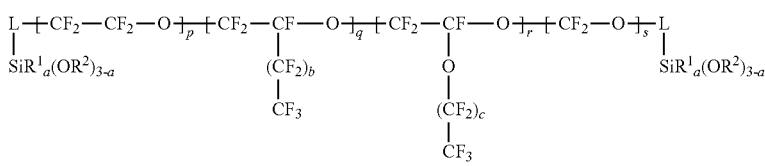

where a is an integer from 0 to 2; b and c are independently from 0 to 10; p, q, r, and are independently the mole percentage of their respective monomer; and each L is a linking group. Exemplary linking groups include alkyl, amide, carbonyl, and combinations thereof. The oxysilyl groups ($OR^2$) may be, for example, alkoxy. The perfluoropolyether compound may have an average molecular weight of from about 1000 to about 3000. Please note that Formula (3) only shows the structure of each monomer and their relative amounts, and should not be construed as describing the bonds within the perfluoropolyether (i.e. not as having four blocks). Such perfluoropolyether compounds are commercially available, such as Fluorolink S10 from Solvay, which has terminal ethoxysilane groups, and in which q=r=0.

The term "alkoxy" refers to an alkyl radical (usually linear or branched) bonded to an oxygen atom, e.g. having the formula —$OC_nH_{2n+1}$.

In the second method referenced above, the fluoroelastomer-perfluoropolyether composite is formed from the reaction of a fluoroelastomer, a perfluoropolyether compound that has terminal oxysilyl groups, and an oxyaminosilane. Three ingredients are needed here.

The term "oxyaminosilane" refers to a compound that has at least one silicon atom covalently bonded to an oxygen atom and that has at least one amino group (—$NH_2$). The oxygen atom may be part of a hydrolyzable group, such as an alkoxy or hydroxyl group. The amino group is not necessarily covalently bonded to the silicon atom, but may be joined through a linking group. A general formula for an oxyaminosilane is provided in Formula (4):

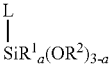 Formula (4)

where R is hydrogen or alkyl; p is an integer from 1 to 3; q is an integer from 0 to 2; and L is a linking group. More desirably, p is 2 or 3. Of course, 4-p-q must be at least 1

Exemplary oxyaminosilanes include [3-(2-aminoethylamino)propyl]trimethoxysilane and 3-aminopropyl trimethoxysilane. In 3-aminopropyl trimethoxysilane, the propyl chain is the linking group. These silanes are commercially available, for example from Sigma-Aldrich or UCT (sold as AO700). The amine functional group may be a primary, secondary, or tertiary amine. The nitrogen atom of an amino group can bond with the fluoroelastomer (i.e the oxygen atom will not bond with the fluoroelastomer). Another group of the oxyaminosilane may be used to react with the oxysilane-terminated compound.

It should be noted that the oxyaminosilane may have more than one silicon atom. For example, the oxyaminosilane may be an amino-terminated siloxane. One example of such an oxyaminosilane is an aminopropyl-terminated siloxane of Formula (4-a):

Formula (4-a)

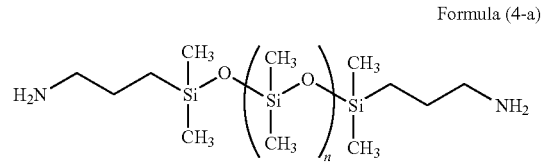

where n can be from 0 to about 25. It is noted that the siloxane of Formula (4-a) contains two amino groups. This siloxane can be described as an aminopropyl terminated polydimethylsiloxane. Such siloxanes are commercially available, for example as DMS-A11 or DMS-A12 from Gelest, Inc. DMS-A11 has a viscosity of 10-15 centiStokes (cSt) and a molecular weight of from 700-1000. DMS-A12 has a viscosity of 20-30 cSt and a molecular weight of from 800-1100. Generally, the amino-terminated siloxane may have a molecular weight of from about 500 to about 1500.

The combination of the fluoroelastomer, the perfluoropolyether compound having terminal oxysilyl groups, and the oxyaminosilane can form multiple networks when forming the composite. First, the fluoroelastomer can be crosslinked with only the oxyaminosilane. Second, the perfluoropolyether compound can react with only itself to form a perfluoropolyether network. Third, depending on the selection of the oxyaminosilane, the oxyaminosilane can be used as a crosslinking agent to crosslink with both the fluoroelastomer and with the perfluoropolyether compound having terminal oxysilyl groups. This combination of networks provides physical strength, chemical resistance, and good ink release/wettability properties to the fluoroelastomer-perfluoropolyether composite. It should be noted that it is possible for one network to be covalently bonded to another network; this might be considered a graft. These three different networks are illustrated below.

The first type of network is formed when the fluoroelastomer is crosslinked with only the oxyaminosilane. This can occur if the oxyaminosilane does not contain any reactive oxygen atoms (e.g. the siloxane of Formula (4-a)) or if the oxyaminosilane simply does not react with the perfluoropolyether compound. The reaction is shown as Reaction (2) below:

crosslink between the fluoroelastomer and in sidechains off of the oxyaminosilane. The reaction is shown as Reaction (4) below:

Reaction (4)

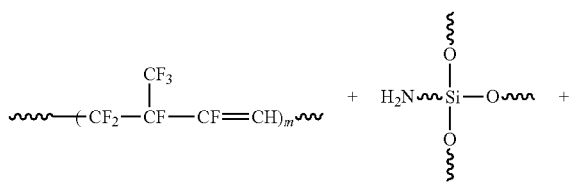

Reaction (2)

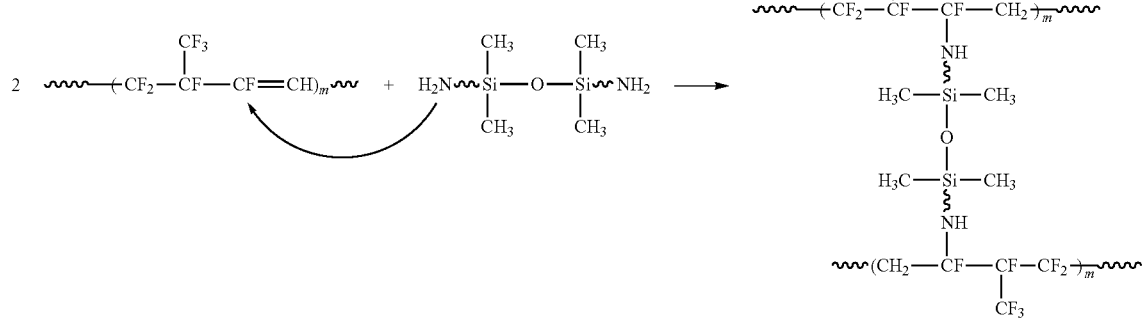

The second type of network is formed when the perfluoropolyether compound reacts with only itself to form a perfluoropolyether network (for example, if the oxyaminosilane cannot react with the perfluoropolyether compound). The reaction is shown as Reaction (3) below:

Reaction (3)

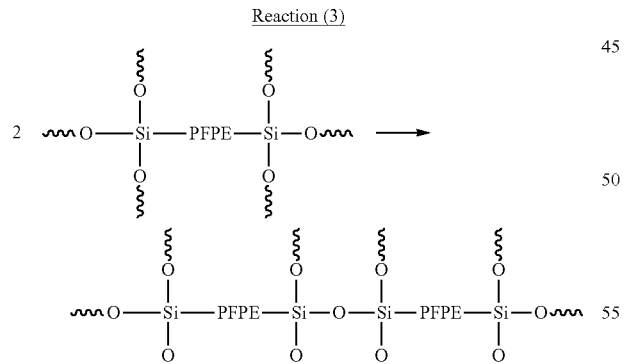

The third type of network is formed when the oxyaminosilane can crosslink with both the fluoroelastomer and with the perfluoropolyether compound (PFPE) having terminal oxysilyl groups. This can occur when the oxyaminosilane has multiple reactive oxygen atoms. It should be noted that the oxyaminosilane can react with multiple perfluoropolyether molecules. Thus, the perfluoropolyether can be present in the -continued

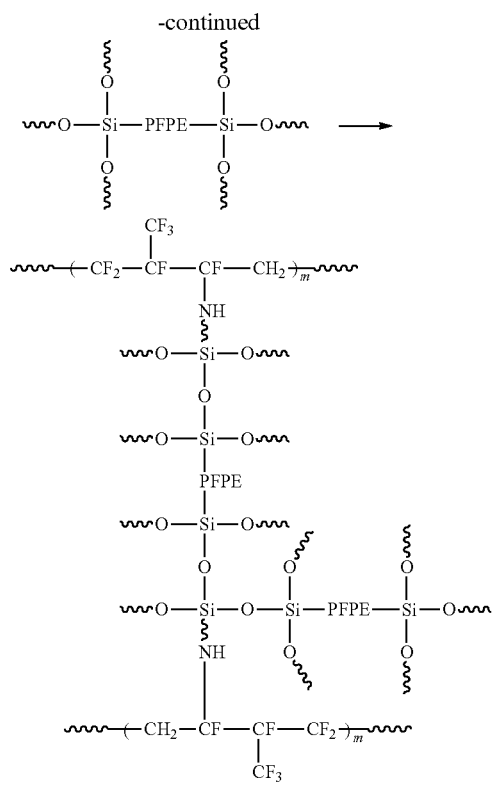

The resulting composite material includes the physical strength and chemical resistance of fluoroelastomer with the ink release, enhanced chemical resistance, and wettability of the perfluoropolyether In both of the methods referred to above, the reaction between the fluoroelastomer, the perfluoropolyether compound, and the optional oxyaminosilane generally occurs in a reaction mixture that also contains a solvent. Suitable solvents include ketones, such as methyl ethyl ketone or methyl isobutyl ketone. Other suitable solvents may include N-methyl pyrrolidone, methyl amyl ketone, ethyl acetate, amyl acetate, and acetone.

The weight ratio of the fluoroelastomer to the perfluoropolyether compound may be from about 50:40 to about 85:5. When the oxyaminosilane is present, the mole ratio of the oxyaminosilane to the perfluoropolyether compound may be from about 2:1 to about 1:10. These ratios apply to both the reaction mixture and to the final surface layer.

If desired, the surface layer may also include filler. The filler may impart improved wear resistance, thermal conductivity, and/or other properties. In embodiments, the filler may be carbon black, carbon nanotubes, graphite, graphene, carbon fibers, or a metal oxide such as iron oxide (FeO). The filler may have an average particle size of from about 2 nanometers to about 10 microns.

The filler may make up from about 5 to about 20 weight percent of the surface layer, including from about 7 to about 15 weight percent, when present. The fluoroelastomer-perfluoropolyether composite may make up from about 80 to about 100 weight percent of the surface layer, including from about 85 to about 93 weight percent.

If desired, the surface layer may also include other fillers, such as silica. Silica can help increase the tensile strength of the surface layer and increase wear resistance. Silica may be present in an amount of from about 2 to about 30 weight percent of the surface layer, including from about 5 to about 30 weight percent.

If desired, other additives can be incorporated into the fluoroelastomer-perfluoropolyether composite by addition of such additives to the reaction mixture. For example, generally any polymer containing amino, hydroxyl, or alkoxy groups could be crosslinked in the reaction mechanism described above.

The surface layer may have a thickness of from about 0.5 microns (μm) to about 100 microns, depending on the requirements of the overall printing system.

Examples of suitable substrate materials include in the case of roller or film-type substrates, metals such as aluminum, stainless steel, steel, nickel and the like. In the case of film-type substrates, suitable substrates include high temperature plastics that are suitable for allowing a high operating temperature (i.e., greater than about 80° C., preferably greater than 200° C.), and capable of exhibiting high mechanical strength. In embodiments, the plastic has a flexural strength of from about 2,000,000 to about 3,000,000 psi, and a flexural modulus of from about 25,000 to about 55,000 psi. Plastics possessing the above characteristics and which are suitable for use as the substrate for the fuser members include epoxy; polyphenylene sulfide such as that sold under the tradenames FORTRON® available from Hoechst Celanese, RYTON R-4® available from Phillips Petroleum, and SUPEC® available from General Electric; polyimides such as polyamide-imide sold under the tradename TORLON® 7130 available from Amoco; polyketones such as those sold under the tradename KADEL® E1230 available from Amoco, polyether ether ketone sold under the tradename PEEK 450GL30 from Victrex, polyaryletherketone, and the like; polyamides such as polyphthalamide sold under the tradename AMODEL® available from Amoco; polyethers such as polyethersulfone, polyetherimide, polyaryletherketone, and the like; polyparabanic acid, and the like; liquid crystalline resin (XYDAR®) available from Amoco; ULTEM® available from General Electric; ULTRAPEK® available from BASF; and the like, and mixtures thereof. Other suitable substrate materials include fluoroelastomers such as those sold under the tradename VITON® from DuPont; silicone rubbers, and other elastomeric materials. The substrate may also comprise a mixture of any of the above materials. In embodiments, the substrate comprises aluminum or stainless steel. The substrate could potentially also be a multi-layered structures including fabric and fabric/elastomer composites.

The substrate as a film, sheet, belt, or the like, may have a thickness of from about 25 to about 250 micrometers, or, in some embodiments, from about 60 to about 100 micrometers.

Examples of materials used for the intermediate layer(s) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use in the intermediate layer(s) include fluoroelastomers. The fluoroelastomers may be from the class of copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

Examples of three known fluoroelastomers are a class of copolymers of two of vinylidenefluoride, hexafluoropropylene, and tetrafluoroethylene, such as those known commercially as VITON A®; a class of terpolymers of vinylidenefluoride, hexafluoropropylene, and tetrafluoroethylene known commercially as VITON B®; and a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON OH® have about 35 weight percent of vinylidenefluoride, about 34 weight percent of hexafluoropropylene, and about 29 weight percent of tetrafluoroethylene, with about 2 weight percent cure site monomer.

The thickness of the functional intermediate layer 220 can be from about 30 microns to about 7,000 microns, or from about 100 microns to about 800 microns, or from about 150 to about 500 microns. For example, in the case of a roll structure, the thickness may be from about 5,000 microns to about 7,000 microns.

Methods of manufacturing the fuser member surface layer are also disclosed. The methods may include depositing a surface layer composition upon a mold; and curing the surface layer at an elevated temperature. The surface layer composition comprises a fluoroelastomer, a perfluoropolyether compound, and optionally an oxyaminosilane.

The deposition may be by flow coating or by pouring. The mold provides the texture for the surface layer. The curing may be performed at a temperature of from about 400° F. to about 500° F. The curing may occur for a time period of from about 15 minutes to about 48 hours.

Aspects of the present disclosure may be further understood by referring to the following examples. The examples are illustrative, and are not intended to be limiting embodiments thereof.

EXAMPLES

Comparative Example 1

For Comparative Example 1, a surface comprising Dai-el G-621 fluoropolymer was evaluated. A solid fluoroelastomer was added to MIBK to create a polymer solution of 20% solids by weight. Aminosilane crosslinker was added. The material was rolled on a roll mill for 10-15 minutes and then immediately coated onto an appropriately prepared substrate. Once the solvent flashed from the coated material formulation, it was heated in a convection oven for 16 hours at 450 degrees Fahrenheit.

Example 1

For Example 1, a surface was evaluated that was made from a composite comprising Dai-el G-621 fluoropolymer with 10 wt % Fluorolink S10 by weight of the formulation (minus solvents). A solid fluoroelastomer was added to MIBK to create a polymer solution of 20% solids by weight.//Under heating and constant stirring at 80 degrees C., an aminosilane coupler was added to the solution. After approximately 5 minutes, a PFPE graft material (Fluorolink S10) was added to the solution and stirring was continued for 2-4 hours. The material was cooled and//additional aminosilane crosslinker was added. The material was rolled on a roll mill for 10-15 minutes and then immediately coated onto an appropriately prepared substrate. Once the solvent flashed from the coated material formulation, it was heated in a convection oven for 16 hours at 450 degrees Fahrenheit.

Test and Results

Contact angle, sliding angle, and printing evaluations were conducted. The contact angle and sliding angle evaluations were performed using hexadecane.

Table 1 shows the contact angles and sliding angles for the surface comprising only G621 (C1) compared to the surface including the composite comprising G621 with 10% Fluorolink S10 (E1).

TABLE 1

| Example | Material | Contact Angle (hexadecane) | Sliding Angle (hexadecane) | Surface Energy |
|---------|----------|---------------------------|---------------------------|----------------|
| C1 | G621 | 41.2 (2.1) | Does not slide | 27.6 |
| E1 | G621-Fluorolink (10%) | 68.1 (2.8) | 35-40 | 12.4 |

The contact angle for hexadecane was higher for Example 1 than for Comparative Example 1, indicating the oleophobic nature of the Fluorolink S10 composite. The sliding angle evaluations showed that hexane slid off the surface of Example 1 whereas hexane stuck to the surface of Comparative Example 1. This indicates the non-stickiness of the composite of the present disclosure compared to a fluoropolymer alone. Surface energies were calculated using water, diidomethane, and formamide. The surface energy data shows a significant decrease in the composite of Example 1 compared to the fluoropolymer of Comparative Example 1, further indicating an increase in the non-stickiness and anti-contamination properties of the surface which included perfluoropolyether.

Print testing was completed on a Chamonix printer including a fuser belts coated with the materials of Example 1 and Comparative Example 1. Comparable print quality was observed for print testing with both belts. The gloss was slightly lower for the belt including the composite.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A fuser member comprising a surface layer, wherein the surface layer includes a fluoroelastomer-perfluoropolyether composite formed from a reaction mixture comprising a fluoroelastomer, perfluoropolyether compound, and an oxyaminosilane;
    wherein the perfluoropolyether compound includes terminal oxysilane groups, and wherein the mole ratio of the oxyaminosilane to the perfluoropolyether compound is from about 2:1 to about 1:10.

2. The fuser member of claim 1, wherein the weight ratio of fluoroelastomer to perfluoropolyether compound is from about 50:40 to about 85:5.

3. The fuser member of claim 1, wherein the oxyaminosilane is an amino-terminated siloxane.

4. The fuser member of claim 3, wherein the amino-terminated siloxane is an aminopropyl terminated polydimethylsiloxane.

5. The fuser member of claim 3, wherein the amino-terminated siloxane has a molecular weight of from about 500 to about 1500.

6. The fuser member of claim 1, wherein the surface layer further comprises a filler.

7. The fuser member of claim 6, wherein the filler is present in an amount of from 5 to about 20 weight percent of the surface layer.

8. The fuser member of claim 6, wherein the filler is selected from the group consisting of carbon black, iron oxide, carbon nanotubes, graphite, graphene, and carbon fibers.

9. The fuser member of claim 6, wherein the filler has an average particle size of from about 2 nanometers to about 10 microns.

10. A method of manufacturing a fuser member surface layer, comprising:
    depositing a surface layer composition upon a mold; and
    curing the surface layer at an elevated temperature;
    wherein the surface layer composition comprises a fluoroelastomer-perfluoropolyether composite formed from a reaction mixture comprising a fluoroelastomer, perfluoropolyether compound, and an oxyaminosilane, wherein the perfluoropolyether compound includes terminal oxysilane groups, and wherein the mole ratio of the oxyaminosilane to the perfluoropolyether compound is from about 2:1 to about 1:10.

11. The method of claim 10, wherein the curing is conducted at a temperature of from about 400° F. to about 500° F.

12. The method of claim 10, wherein the weight ratio of fluoroelastomer to perfluoropolyether compound is from about 50:40 to about 85:5.

13. A printing system, comprising:
    a fuser member comprising a surface layer;
    the surface layer includes a fluoroelastomer-perfluoropolyether composite formed from a reaction mixture comprising a fluoroelastomer, a perfluoropolyether compound, and an oxyaminosilane;
    wherein the perfluoropolyether compound includes terminal oxysilane groups, and wherein the mole ratio of the oxyaminosilane to the perfluoropolyether compound is from about 2:1 to about 1:10.

14. The printing system of claim 13, wherein the weight ratio of fluoroelastomer to perfluoropolyether compound is from about 50:40 to about 85:5.

* * * * *